United States Patent
Duyar

(10) Patent No.: US 11,050,919 B2
(45) Date of Patent: Jun. 29, 2021

(54) METHOD FOR MULTIPLE PHOTOGRAPH MOBILE APPLICATION

(71) Applicant: AD BILISIM TEKNOLOJI YATIRIM ARACILIK GIDA IHRACAT SANAYI VE TICARET ANONIM SIRKETI, Izmir (TR)

(72) Inventor: Ali Duyar, Izmir (TR)

(*) Notice: Subject to any disclaimer, the term of this patent is extended or adjusted under 35 U.S.C. 154(b) by 0 days.

(21) Appl. No.: 16/634,485

(22) PCT Filed: Oct. 4, 2018

(86) PCT No.: PCT/TR2018/050552
§ 371 (c)(1),
(2) Date: Jan. 27, 2020

(87) PCT Pub. No.: WO2020/072010
PCT Pub. Date: Apr. 9, 2020

(65) Prior Publication Data
US 2021/0136294 A1 May 6, 2021

(51) Int. Cl.
*H04N 5/232* (2006.01)
*H04N 5/247* (2006.01)

(52) U.S. Cl.
CPC ....... *H04N 5/232061* (2018.08); *H04N 5/247* (2013.01)

(58) Field of Classification Search
CPC ............. H04N 5/232061; H04N 5/247; H04N 5/23203; H04N 5/23206
See application file for complete search history.

(56) References Cited

U.S. PATENT DOCUMENTS

| | | | |
|---|---|---|---|
| 7,460,781 B2 * | 12/2008 | Kanai | H04N 5/23203 348/211.3 |
| 9,113,068 B1 | 8/2015 | Whitson et al. | |
| 10,419,657 B2 * | 9/2019 | Barnes | G06T 15/04 |
| 2004/0183915 A1 * | 9/2004 | Gotohda | H04N 5/23206 348/207.11 |
| 2006/0001744 A1 * | 1/2006 | Singh | H04N 5/23203 348/207.99 |
| 2007/0283031 A1 * | 12/2007 | Yoshida | H04N 1/00148 709/230 |
| 2008/0158366 A1 * | 7/2008 | Jung | H04N 1/00159 348/207.1 |
| 2013/0128052 A1 * | 5/2013 | Catrein | H04N 7/181 348/159 |
| 2015/0207977 A1 * | 7/2015 | Cho | H04N 5/23245 348/207.11 |
| 2017/0111413 A1 * | 4/2017 | Nowak | H04N 5/77 |
| 2017/0171452 A1 * | 6/2017 | Spielberg | H04N 5/247 |

FOREIGN PATENT DOCUMENTS

| | | |
|---|---|---|
| CN | 105635558 A | 6/2016 |
| WO | 2011088803 A1 | 7/2011 |

OTHER PUBLICATIONS

International Search Report for corresponding PCT/TR2018/050552.

* cited by examiner

*Primary Examiner* — Timothy J Henn

(57) ABSTRACT

Disclosed is a method which enables users in an environment to take multiple photos by using a main device or one or a plural of member devices that are managed via the main device.

6 Claims, 1 Drawing Sheet

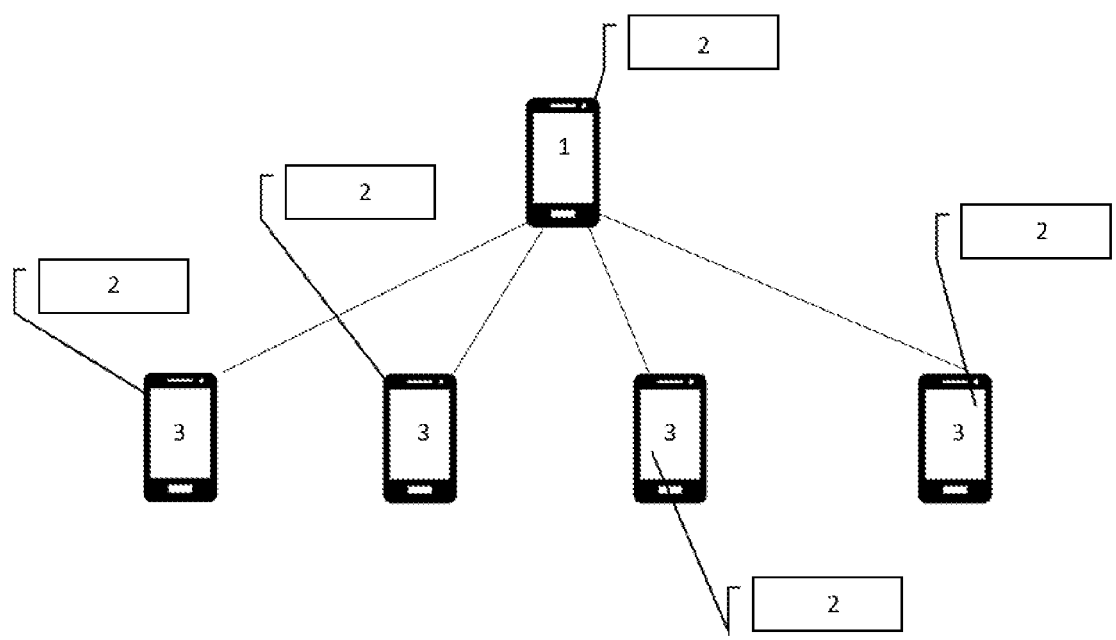

METHOD FOR MULTIPLE PHOTOGRAPH MOBILE APPLICATION

TECHNICAL FIELD

The invention relates to a method which enables taking multiple photos.

Specifically; the invention is related to a method which enables the users in the environment to take multiple photos by using a Main device or one or a plural of Member devices that are managed via the Main device.

PRIOR ART

Today, mobile devices with multimedia contents such as smart phones or tablets are often used by the majority of the society. One of the mostly used properties by the mobile device users is the photos taken by mobile devices. Many photos are taken in order to make the moment eternal, especially in meetings such as work dinners, group activities etc. Family photos that are generally taken by a single mobile device are additionally shared afterwards among the individuals in the photos. In the family photos taken by a single device, only one shot can be performed in one angle at once and when it is desired to have photos with different angles, the individuals need to pose all over again and the shot shall be repeated. This results in several shots for the photos that are not liked and consequently an increased time that is spent for taking photos. In addition, an additional effort is required to share the photos that are taken by a single device with all the individuals that are in the photo.

As a result, a novelty in the technical field is required regarding the problems that are mentioned above and cannot be solved sufficiently by the present technique.

BRIEF DESCRIPTION OF THE INVENTION

The present invention relates to a method of multiple photos mobile application, in order to eliminate the disadvantages mentioned above and provide novel advantages to the related technical field.

Main aim of the invention is to provide a method that enables the individuals in the same environment to take multiple photos via multiple devices at the same time.

Another aim of the invention is to provide a method that enables the sharing of the photos that are taken by a multiple of devices with all the devices that are in the group that is formed.

Another aim of the invention is to provide a method that decreases the time and effort that is needed for the photo-taking, by enabling taking photos from multiple angles at once.

In order to realize all the aims that are mentioned above and can be derived from the detailed description below, the present invention is a method for a multiple photograph mobile application that enables taking multiple photos by using a Main device with the mobile application installed or one or a plural of Member devices with the mobile application installed. According to this, the method comprises the steps of;

Establishing access among the main device and the member devices,
Listing the member device users, with the application installed, on the main device
Forming a group with the member device users that are selected from the said list,
Sending a link type to the member device user group members via the main device,
Main device requesting the camera access permission of the member devices that are the members of the group via the sent link,
Transferring the camera images that are taken by the member device to the main device,
Taking photos by the Main device,
Sharing the photos taken by the main device with all the group members.

Today, the softwares that are designed to work on mobile devices, which are used by almost everyone, such as smartphones, tablets and computers are called "Mobile Application". In other words, coded softwares that comprise algorithms to work on mobile devices are called mobile applications. Mobile applications are generally designed to provide an easier and more practical life.

In order to understand the structuring of the present invention and its advantages with the additional elements fully; an evaluation shall be made by taking the FIGURES, which are explained below, into the account.

BRIEF DESCRIPTION OF THE DRAWINGS

FIG. 1 depicts a schematic view of an exemplar system in which the method of the present invention is implemented.

REFERENCE NUMBERS

1. Main device
2. Mobile application
3. Member device

DETAILED DESCRIPTION OF THE INVENTION

In this detailed description, the novelty of the present invention is explained with examples in order for the issue to be understood in detail and these examples are not limiting in any manner. Our multiple photograph mobile application (2) is a camera application that enables taking multiple photographs. By the virtue of the method of our invention, main device (1), which is a smart mobile device onto which the mobile application (2) is installed, can take multiple photographs by accessing one or plural of member devices (3) onto which the mobile application (2) is installed. According to this, the method comprises the steps of establishing access among the main device (1) and the member devices (3), listing the member device users (3), with the application installed (2), on the main device (1), forming a group with the member device (3) users that are selected from the said list, sending a link type to the member device (3) user group members via the main device (1), main device (1) requesting the camera access permission of the member devices (3) that are the members of the group via the sent link, transferring the camera images that are taken by the member device (3) to the main device (1), taking photos by the Main device (1), sharing the photos taken by the main device (1) with all the group members.

The main idea of our multiple photograph mobile application (2) called "Mulfie" is to enable the users in the same environment to take multiple photographs/selfies. Main device (1) onto which the mobile application (2) is installed, accesses at least one member device (2) onto which the mobile application (2) is installed by using internet connection. By using member device (3) list (friend list) screens shown on the main device (1), a group is formed by the individuals that are selected from this member device (3) list (friend list). Afterwards, a member device (3) user that is in the group, sends a connection type to other users via the main device (1). By this link, a sub-program inside the mobile application (2), i.e. the camera application is opened. By this manner, images that belong to member device (3) cameras are transferred to the main device (1) which requests camera access via the mobile application (2). The images that are taken from the member device (3) cameras are transferred with delay by the Pooling and Socket connection types, it becomes easier by the transferred images, to locate the mobile devices to the angles that are desired and as many photographs as desired can be taken by the main device (1). The photos taken are shared between all devices that are members of the group. Stabilization in data transfer, data import and export is provided by using the Socket and Pooling connection types.

Our mobile application (2) can also operate without Internet. In case that the user does not have Internet connection, the data transfer shall be done via "Bluetooth". If the access cannot be performed via "Bluetooth", in this case, the system shall continue working and deactivate "Bluetooth" and activate Wi-Fi or NFC connections.

The invention claimed is:

1. A method for taking multiple photographs by using a main device onto which a mobile application is installed and at least one member device onto which the mobile application is installed, the method comprising:
   establishing access to the main device and the at least one member device;
   listing a user or users of the at least one member device on the main device;
   forming a group with the user or users selected from the listing;
   sending a link type to the group via the main device;
   requesting camera access permission by the main device to the group via the sent link type;
   transferring camera images that are taken by the at least one member device of the group to the main device;
   taking photos by the main device; and
   sharing the photos taken by the main device with all the at least one member device of the group.

2. The method of claim 1, wherein the step of establishing access comprises;
   establishing access between the main device and the at least one member device via the Internet.

3. The method of claim 1, wherein the step of establishing access comprises;
   establishing access between the main device and the at least one member device via Bluetooth.

4. The method of claim 1, wherein the step of establishing access comprises;
   establishing access between the main device and the at least one member device via Wi-Fi.

5. The method of claim 1, wherein the step of establishing access comprises;
   establishing access between the main device and the at least one member device via an NFC connection.

6. The method of claim 1, wherein the step of transferring camera images comprises;
   transferring the camera images by delayed transference via pooling and socket connection types.

* * * * *